United States Patent
Iwamoto et al.

(10) Patent No.: US 12,076,689 B2
(45) Date of Patent: Sep. 3, 2024

(54) CANISTER

(71) Applicant: FUTABA INDUSTRIAL CO., LTD., Okazaki (JP)

(72) Inventors: Koji Iwamoto, Okazaki (JP); Tamami Ina, Okazaki (JP)

(73) Assignee: Futaba Industrial Co., Ltd., Okazaki (JP)

( * ) Notice: Subject to any disclaimer, the term of this patent is extended or adjusted under 35 U.S.C. 154(b) by 196 days.

(21) Appl. No.: 17/962,281

(22) Filed: Oct. 7, 2022

(65) Prior Publication Data

US 2023/0149847 A1    May 18, 2023

(30) Foreign Application Priority Data

Nov. 12, 2021    (JP) .................................. 2021-185058

(51) Int. Cl.
  B01D 53/00    (2006.01)
  B01D 53/04    (2006.01)
  F02M 25/08    (2006.01)

(52) U.S. Cl.
  CPC .... B01D 53/0415 (2013.01); *B01D 2253/102* (2013.01); *B01D 2253/108* (2013.01);
  (Continued)

(58) Field of Classification Search
  CPC ........ B01D 2253/102; B01D 2253/108; B01D 2257/702; B01D 2259/40086;
  (Continued)

(56) References Cited

U.S. PATENT DOCUMENTS 8,733,325 B2 *    5/2014    Takamatsu ............. F02M 25/08
                                                 123/519
8,992,673 B2 *    3/2015    Mani ...................... B01D 53/04
                                                  96/132
(Continued)

FOREIGN PATENT DOCUMENTS

JP    2010168908 A    8/2010
JP    2015048841 A    3/2015
JP    2015057551 A    3/2015

OTHER PUBLICATIONS

Notice of Reasons for Refusal for Japanese Patent Application No. 2021185058, mailed Jun. 13, 2023, 6 pages.

*Primary Examiner* — Phutthiwat Wongwian
*Assistant Examiner* — Sherman D Manley
(74) *Attorney, Agent, or Firm* — Withrow + Terranova, PLLC; Vincent K. Gustafson

(57) ABSTRACT

Provided is a canister that makes it possible to reduce production costs. One aspect of the present disclosure is a canister. The canister includes an outer case including a charge port that takes in an evaporated fuel, a purge port that discharges the evaporated fuel, and an atmosphere port open to the atmosphere, an inner case arranged inside the outer case, the inner case having an inner space to which the atmosphere port is connected, a first adsorption chamber arranged in the inner space of the inner case, and a second adsorption chamber arranged between the first adsorption chamber and the atmosphere port in a flow path of the evaporated fuel in the inner space of the inner case. A cross-sectional area perpendicular to a gas flow direction in the second adsorption chamber and a cross-sectional area perpendicular to a gas flow direction in the first adsorption chamber are different.

5 Claims, 8 Drawing Sheets

(52) U.S. Cl.
CPC ............... *B01D 2257/702* (2013.01); *B01D 2259/40086* (2013.01); *B01D 2259/403* (2013.01); *B01D 2259/4566* (2013.01); *F02M 25/0836* (2013.01); *F02M 25/0854* (2013.01)

(58) Field of Classification Search
CPC ...... B01D 2259/403; B01D 2259/4566; B01D 2259/4516; B01D 53/0446; B01D 53/0407; F02M 25/0836; F02M 25/0854
See application file for complete search history.

(56) References Cited

U.S. PATENT DOCUMENTS

| | | | |
|---|---|---|---|
| 11,149,694 B2 * | 10/2021 | Seki | F02M 25/08 |
| 2005/0172938 A1 * | 8/2005 | Uchino | F02M 25/0854 96/132 |
| 2005/0204924 A1 * | 9/2005 | Nakamura | F02M 25/0854 96/147 |
| 2010/0180870 A1 | 7/2010 | Kosugi | |
| 2012/0186563 A1 * | 7/2012 | Hasegawa | F02M 25/0854 123/519 |
| 2012/0234301 A1 * | 9/2012 | Takamatsu | F02M 25/0854 123/519 |
| 2012/0304865 A1 * | 12/2012 | Sugiura | F02M 25/0854 96/131 |
| 2013/0037006 A1 * | 2/2013 | Kosugi | F02M 25/0854 123/520 |
| 2013/0284154 A1 * | 10/2013 | Makino | F02M 25/0854 123/519 |
| 2015/0007799 A1 * | 1/2015 | Takeshita | F02M 25/0854 123/519 |
| 2017/0002770 A1 * | 1/2017 | Kosugi | B01D 53/04 |
| 2019/0249624 A1 * | 8/2019 | Seki | B01D 53/0407 |

* cited by examiner

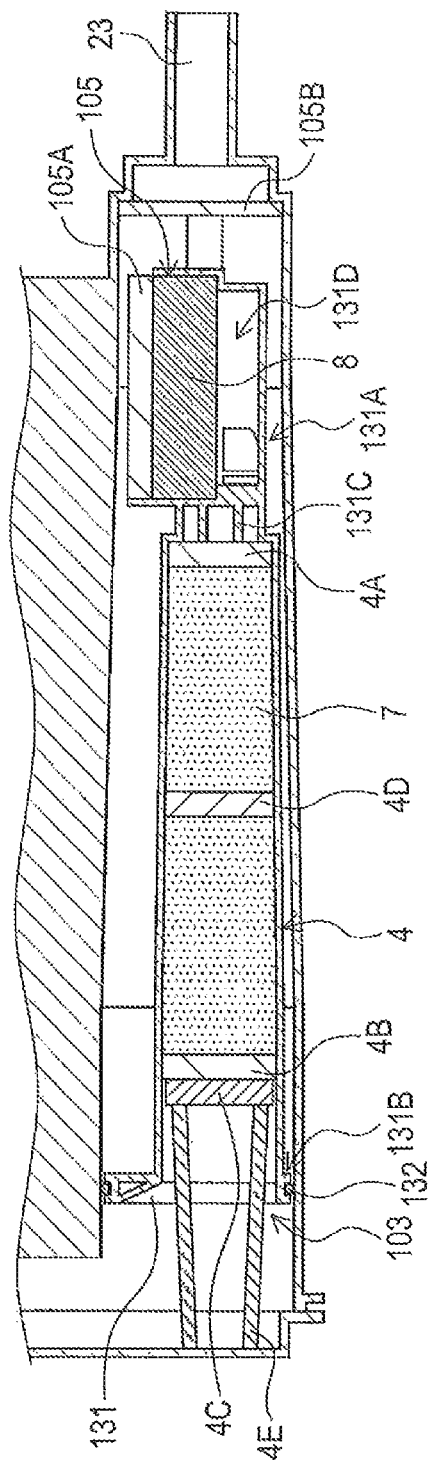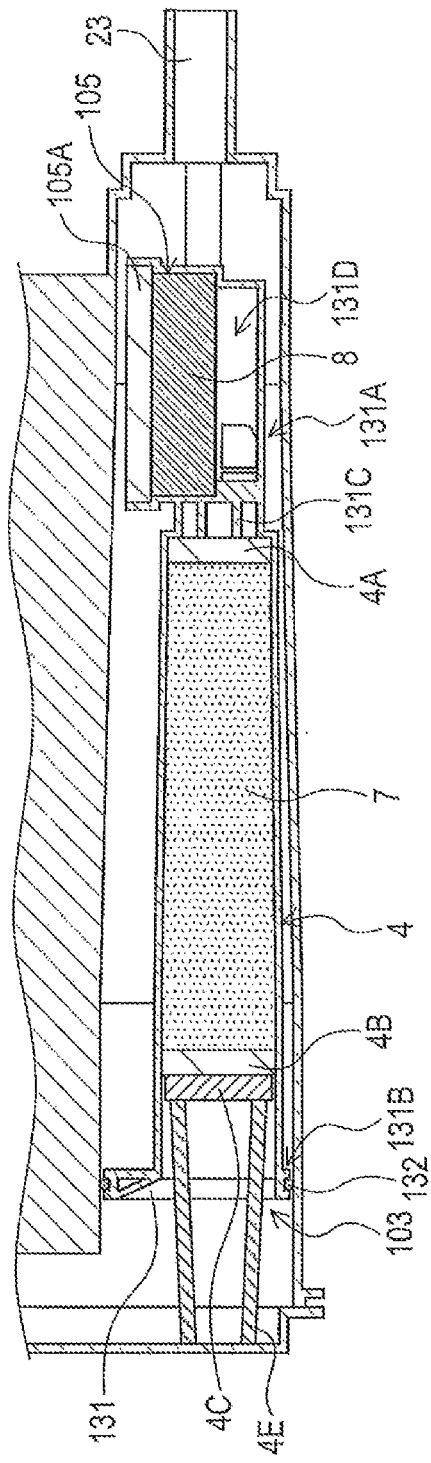
FIG. 7A
FIG. 7B

CANISTER

CROSS-REFERENCE TO RELATED APPLICATIONS

This application claims the benefit of priority based on Japanese patent application No. 2021-185058 filed on Nov. 12, 2021 with the Japan Patent Office and the entire disclosure of which is incorporated herein by reference.

BACKGROUND

The present disclosure relates to a canister.

A canister, which inhibits the discharge of evaporated fuel to the atmosphere, is attached to a fuel tank of a vehicle. The canister adsorbs the evaporated fuel to an adsorbent, desorbs fuel from the adsorbent with taken-in air for purging, and supplies the purged fuel to an engine.

The canister usually has multiple absorption chambers. By changing the cross-sectional areas of these multiple adsorption chambers, ventilation resistance can be adjusted (see Japanese Unexamined Patent Application Publication No. 2015-57551).

SUMMARY

In the canister having the above-described multiple adsorption chambers with different cross-sectional areas, at the time of molding a canister case, a metallic mold may have a part that cannot be pulled out depending on the layout and shapes of the adsorption chambers. In this case, the canister case needs to be divided into multiple parts.

Dividing the canister case into multiple parts increases welding portions of the canister case during the production of the canister. Because of this, arrangement of welding equipment may be required and the production time may increase, resulting in an increase in production costs of the canister.

In one aspect of the present disclosure, it is preferable to provide a canister that makes it possible to reduce production costs.

One aspect of the present disclosure is a canister for adsorbing and desorbing evaporated fuel occurred in a fuel tank of a vehicle. The canister includes an outer case including a charge port that takes in the evaporated fuel, a purge port that discharges the evaporated fuel, and an atmosphere port open to the atmosphere, an inner case arranged inside the outer case, the inner case having an inner space to which the atmosphere port is connected directly or through another chamber, a first adsorption chamber, a second adsorption chamber, a first adsorbent stored in the first adsorption chamber, and a second adsorbent stored in the second adsorption chamber.

The first adsorption chamber is arranged in the inner space of the inner case. The second adsorption chamber is arranged between the first adsorption chamber and the atmosphere port in a flow path of the evaporated fuel in the inner space of the inner case. A cross-sectional area perpendicular to a gas flow direction in the second adsorption chamber and a cross-sectional area perpendicular to a gas flow direction in the first adsorption chamber are different.

In this configuration, by inserting the inner case into the outer case, the canister including the first adsorption chamber and the second adsorption chamber having different cross-sectional areas can be obtained. This reduces the welding portions of the case in the canister. As a result, production costs of the canister can be reduced.

One aspect of the present disclosure may further include a third adsorption chamber arranged inside the outer case and outside the inner case, the third adsorption chamber having the charge port and the purge port connected thereto, and a third adsorbent stored in the third adsorption chamber. This configuration allows to relatively easily ensure a capacity of the third adsorption chamber provided as a main chamber.

In one aspect of the present disclosure, the cross-sectional area perpendicular to the gas flow direction in the second adsorption chamber may be larger than the cross-sectional area perpendicular to the gas flow direction in the first adsorption chamber. This configuration reduces the ventilation resistance of the canister while reducing the production costs of the canister.

In one aspect of the present disclosure, the gas flow direction in the second adsorption chamber may be parallel to the gas flow direction in the first adsorption chamber. This configuration simplifies the structure of the inner case. As a result, the effect of reducing the production costs of the canister is promoted.

In one aspect of the present disclosure, the gas flow direction in the second adsorption chamber may intersect with the gas flow direction in the first adsorption chamber. This configuration enhances the degree of freedom in an external size of the canister. As a result, the canister can be made compact.

BRIEF DESCRIPTION OF THE DRAWINGS

Embodiments of the present disclosure will be described hereinafter by way of example with reference to the accompanying drawings, in which:

FIG. 7A is a modified example of a first adsorption chamber in the canister of FIG. 5, and FIG. 7B is a modified example of a filter layout in the canister of FIG. 5.

DETAILED DESCRIPTION OF EXEMPLARY EMBODIMENTS

1. First Embodiment

1-1. Configuration

Figure 1:
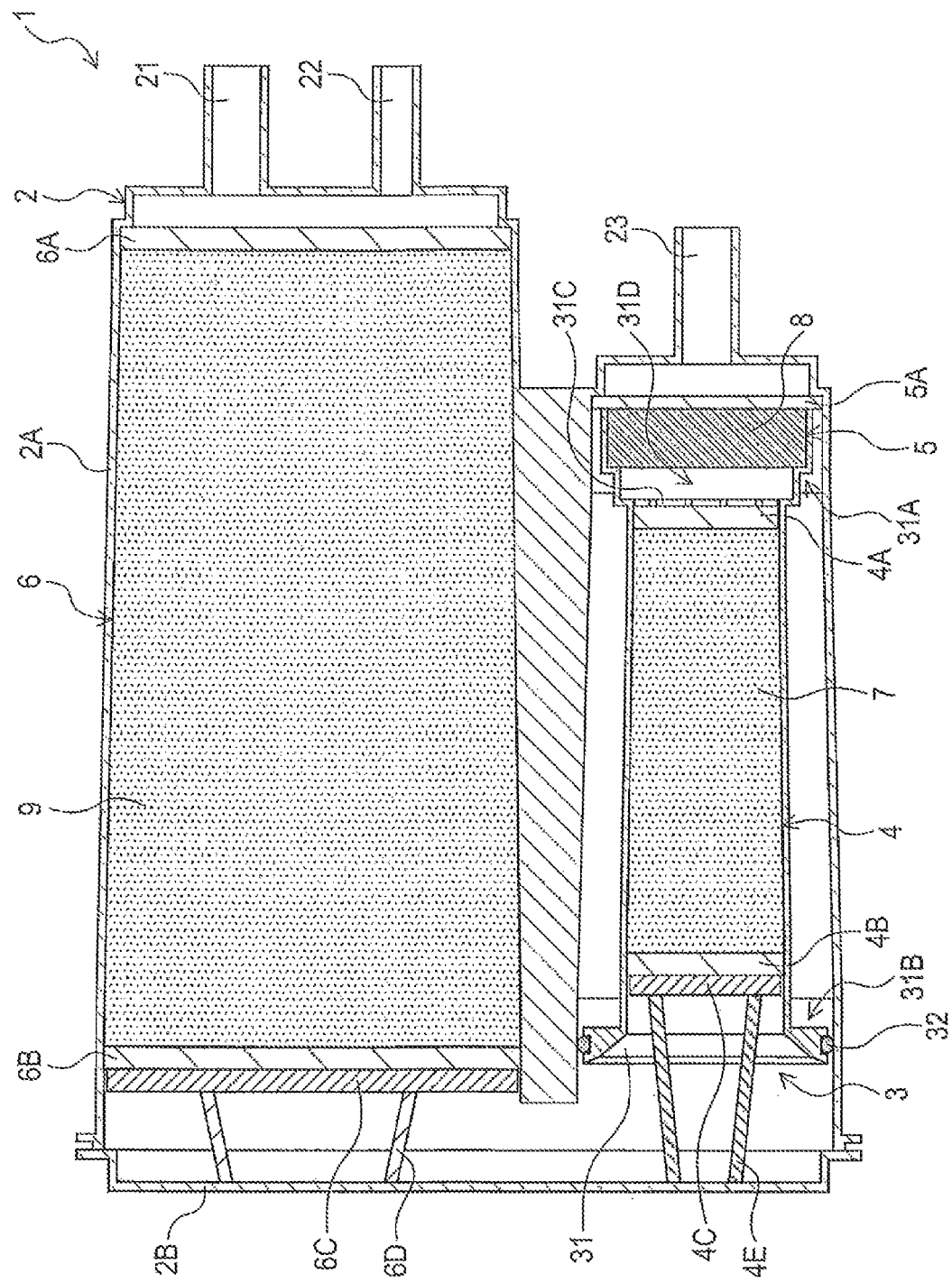
FIG. 1 is a schematic sectional view of a canister in an embodiment.

A canister 1 shown in FIG. 1 is an evaporated fuel treatment device that adsorbs and desorbs evaporated fuel occurred in a fuel tank of a vehicle.

The canister 1 includes an outer case 2, an inner case 3, a first adsorption chamber 4, a second adsorption chamber 5, a third adsorption chamber 6, a first adsorbent 7, a second adsorbent 8, and a third adsorbent 9.

Outer Case

The outer case 2 is a housing including an inner space in which the inner case 3 and the third adsorption chamber 6 are to be arranged, a charge port 21, a purge port 22, and an atmosphere port 23.

The charge port 21 is connected to the fuel tank of the vehicle via piping. The charge port 21 is configured to take the evaporated fuel generated in the fuel tank into the canister 1.

The purge port 22 is connected to an intake pipe of an engine of the vehicle via a purge valve. The purge port 22 is configured to discharge the evaporated fuel 1 from the canister 1 and supply it to the engine.

The atmosphere port 23 is open to the atmosphere. The atmosphere port 23 discharges gas from which the evaporated fuel has been removed to the atmosphere. The atmosphere port 23 also takes in external air (i.e. purge air) to desorb (i.e. purge) the evaporated fuel adsorbed in the canister 1.

The outer case 2 includes a main body 2A having the charge port 21, the purge port 22, the atmosphere port 23, and an opening through which the inner case 3 can be inserted, and a lid 2B to be attached to the opening of the main body 2A.

Figure 2:
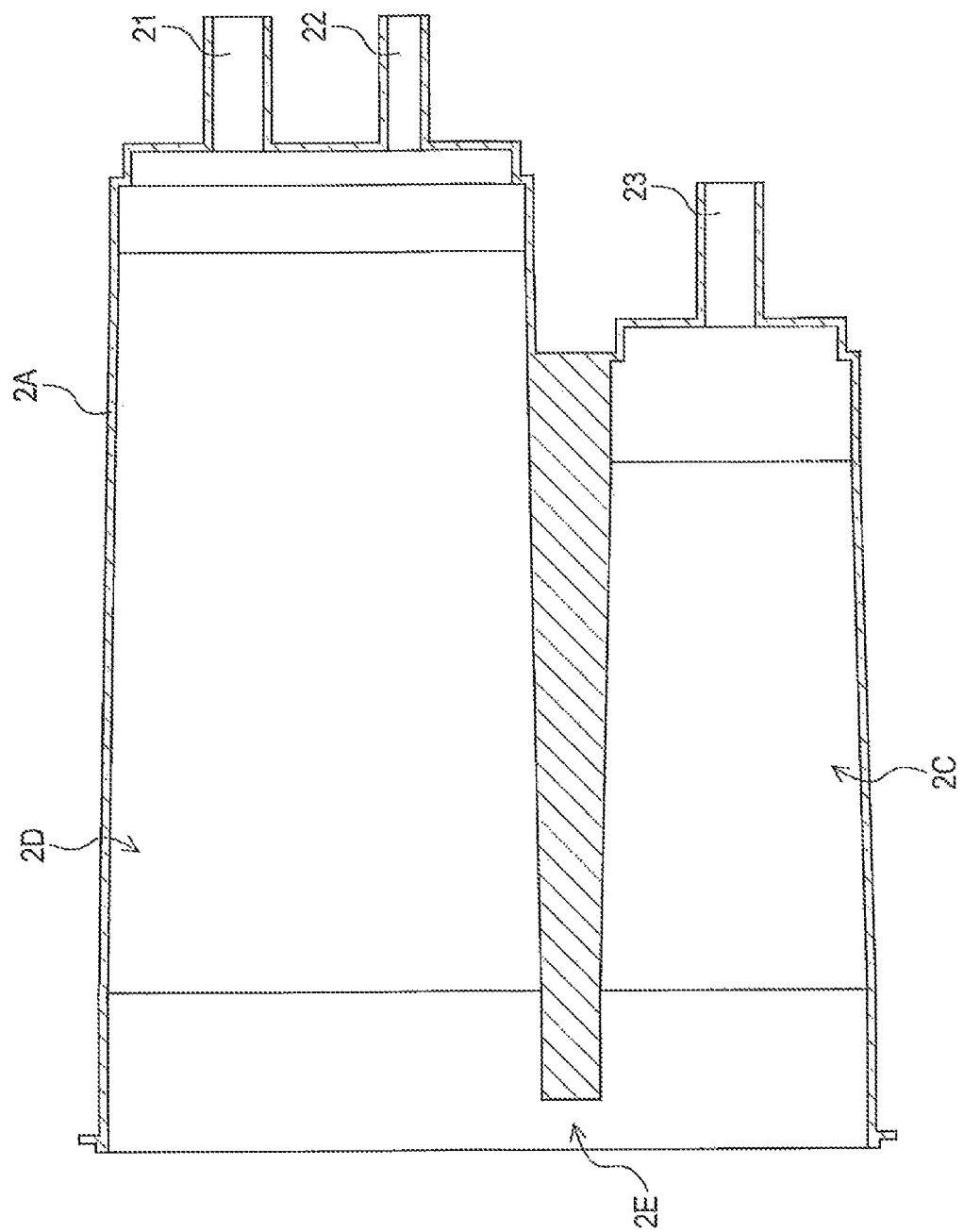
FIG. 2 is a schematic sectional view of a main body of an outer case in the canister of FIG. 1.

As shown in FIG. 2, the main body 2A includes a first space 2C in which the inner case 3 is arranged, a second space 2D in which the third adsorption chamber 6 is arranged, and a communicating portion 2E forming a communicating passage between the first space 2C and the second space 2D.

Inner Case

Figure 3A:
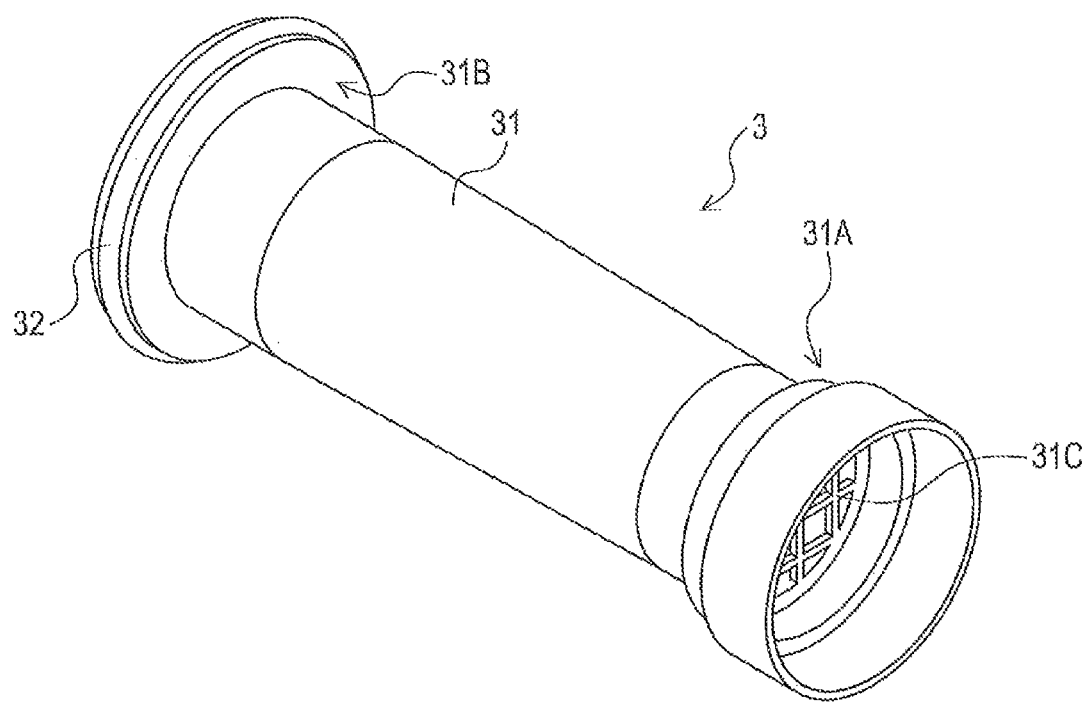
FIG. 3A is a schematic perspective view of an inner case in the canister of FIG. 1.
Figure 3B:
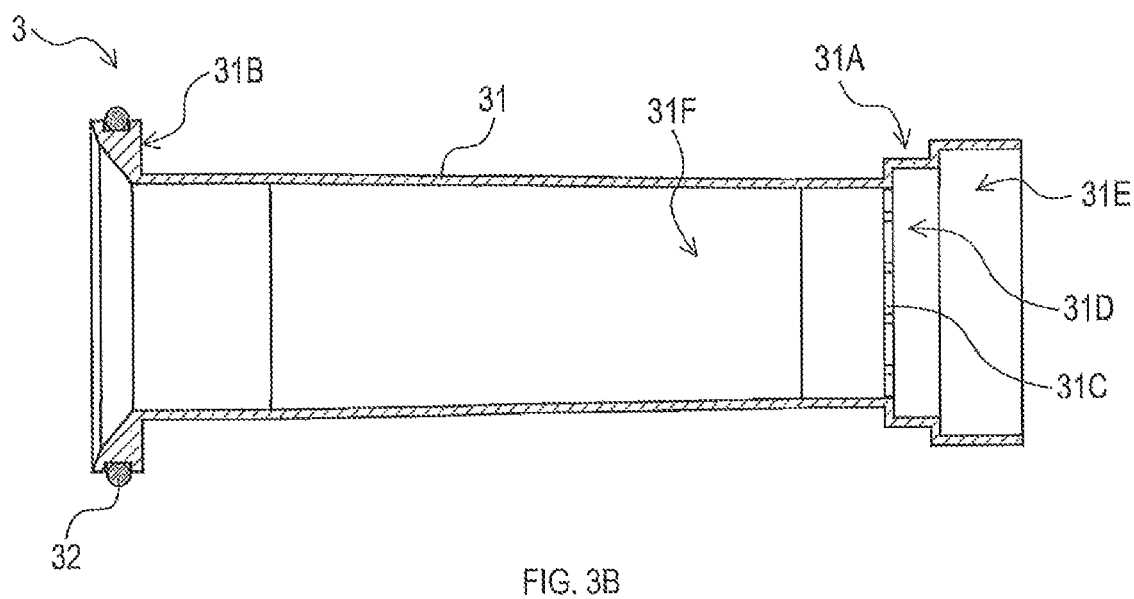
FIG. 3B is a schematic sectional view of the inner case of FIG. 3A.

The inner case 3 shown in FIG. 3A and FIG. 3B is arranged inside the outer case 2, and has an inner space connected through to the atmosphere port 23. The inner case 3 is obtained, for example, by molding a resin using a metallic mold.

Specifically, the inner case 3 has a cylindrical body 31 having a cylindrical shape and a sealing member 32. The cylindrical body 31 has a first end 31A whose diameter increases stepwise outward in an axial direction and a flange-shaped second end 31B.

The first end 31A is an end to be connected to the atmosphere port 23 (see FIG. 1). The first end 31A includes a first enlarged diameter portion 31D having an inner diameter larger than that of a central space 31F located inside relative to the first end 31A and a second enlarged diameter portion 31E having an inner diameter larger than that of the first enlarged diameter portion 31D. In the central space 31F, the first adsorption chamber 4 is formed by placing the first adsorbent 7.

The first enlarged diameter portion 31D is arranged adjacent to the central space 31F and separated from the central space 31F by a grid-shaped partition plate 31C, for example. The first enlarged diameter portion 31D constitutes a space to connect the first adsorption chamber 4 and the second adsorption chamber 5 to communicate with each other.

The second enlarged diameter portion 31E is provided outside the first enlarged diameter portion 31D in the axial direction so as to be continuous to the first enlarged diameter portion 31D. In the second enlarged diameter portion 31E, the second adsorption chamber 5 is formed by placing the second adsorbent 8.

The second end 31B is an end opposite the first end 31A. That is, the second end 31B is an end communicated with the third adsorption chamber 6. The second end 31B has an outer diameter larger than diameters of any parts of the cylindrical body 31 other than the second end 31B. However, the outer diameter of the second end 31B may be equal to or less than the outer diameter of the first end 31A.

The second end 31B has the sealing member 32 arranged in an outer peripheral surface thereof. The sealing member 32 is an elastic ring-shaped member fitted in a groove formed on the outer peripheral surface of the second end 31B. The sealing member 32 is arranged to fill a gap at a joined portion between the outer case 2 and the inner case 3.

Examples of the sealing member 32 to be used may include an O-ring and a gasket. The position of the inner case 3 relative to the outer case 2 is maintained by a frictional force of the sealing member 32. In the present embodiment, the inner ease 3 is not joined to the outer case 2 at a position other than the sealing member 32. That is, in the present embodiment, there is no welding point between the inner case 3 and the outer case 2. The inner case 3 may be in contact with the outer case 2 at a position other than the sealing member 32.

First Adsorption Chamber

As shown in FIG. 1, the first adsorption chamber 4 is arranged in the inner space of the inner case 3 (specifically, in the central space 31F).

The first adsorption chamber 4 stores the first adsorbent 7, and communicates with the third adsorption chamber 6 so that gas can flow freely between the third adsorption chamber 6 and the first adsorption chamber 4 through the flow path formed by the outer case 2. The first adsorption chamber 4 is arranged side by side with the third adsorption chamber 6 in a radial direction of the third adsorption chamber 6 so that a gas flow direction in the first adsorption chamber 4 is parallel to a gas flow direction in the third adsorption chamber 6.

The first adsorption chamber 4 is defined by a first filter 4A and a second filter 4B arranged inside the cylindrical body 31 of the inner case 3. The first filter 4A is in contact with the partition plate 31C, and separates the second adsorption chamber 5 from the first adsorption chamber 4.

The second filter 4B separates the communicating passage to the third adsorption chamber 6 from the first adsorption chamber 4. The second filter 4B is pressed toward the second adsorption chamber 5 and the atmosphere port 23 by a spring 4E through a grid 4C having a grid shape. The grid 4C may have a slit shape, a porous shape, or the like.

The first filter 4A and the second filter 4B defining the adsorption chamber 4 are configured to allow gas to pass through while not allowing the first adsorbent 7 to pass through. That is, the filters 4A, 4B hold the first adsorbent 7 therebetween in the first adsorption chamber 4.

Second Adsorption Chamber

The second adsorption chamber 5 is arranged in the inner space of the inner case 3 (specifically, inside the first end 31A).

The second adsorption chamber 5 stores the second adsorbent 8, and arranged between the first adsorption chamber 4 and the atmosphere port 23 in the flow path of the evaporated fuel. The second adsorption chamber 5 communicates with both of the first adsorption chamber 4 and the atmosphere port 23. A gas flow direction in the second adsorption chamber 5 is parallel to the gas flow direction in the first adsorption chamber 4.

A cross-sectional area perpendicular to the gas flow direction in the second adsorption chamber 5 is larger than a cross-sectional area perpendicular to the gas flow direction in the first adsorption chamber 4. A length of the second adsorption chamber 5 in the gas flow direction is smaller than a length of the first adsorption chamber 4 in the gas flow direction. However, the length of the second adsorption chamber 5 in the gas flow direction may be larger than the length of the first adsorption chamber 4 in the gas flow direction.

The second adsorption chamber 5 is defined by a filter 5A arranged to cover the first end 31A of the inner case 3 and a stepped portion in the first end 31A. The filter 5A separates a space communicating with the atmosphere port 23 from the second adsorption chamber 5. The filter 5A defining the second adsorption chamber 5 has functions similar to those of the filters 4A, 4B of the first adsorption chamber 4.

The filter 5A is fixed to the outer case 2 by ultrasonic welding, for example. The inner case 3 is inserted into the outer case 2 so that the first end 31A is pressed to the filter 5A.

The filter 5A may be fixed to the inner case 3 by ultrasonic welding, for example. In this case, the filter 5A is attached to the outer case 2 by insertion of the inner case 3.

In this embodiment, the second adsorbent 8 is a block-shaped agglomeration of a hardened granular adsorbent, or an aggregate of fibrous adsorbents. A surface of the second adsorbent 8 opposite the atmosphere port 23 is in contact with stepped portions of the first end 31A. Thus, between the second adsorbent 8 and the partition plate 31C, a buffer space configured of the first enlarged diameter portion 31D is provided. This buffer space does not contain an adsorbent. When the second adsorbent 8 is used in the form of agglomeration or aggregate in this way, the filter 5A is not necessarily provided to hold the adsorbent.

In this embodiment, no welding is done to the second adsorption chamber 5, which can inhibit the separation of the agglomeration or aggregate of the adsorbent due to a vibration at the time of welding. In addition, the cross-sectional area of the second adsorption chamber 5 is larger than the cross-sectional area of the first adsorption chamber 4. This inhibits an increase in the ventilation resistance of the canister 1 even if an agglomeration or aggregate having large ventilation resistance is used for the second adsorbent 8.

The inner case 3 is installed in the main body 2A of the outer case 2 as the cartridge filled with the second adsorbent 8. The inner case 3 is installed, and then filled with the first adsorbent 7, and thereafter, the lid 2B of the outer case 2 is attached to the main body 2A.

Third Adsorption Chamber

The third adsorption chamber 6 is arranged inside the outer case 2 and outside the inner case 3 (specifically, in the second space 2D of the outer case 2).

The third adsorption chamber 6 stores the third adsorbent 9, and the charge port 21 and the purge port 22 are connected. The third adsorption chamber 6 adsorbs the evaporated fuel taken in from the charge port 21. The third adsorption chamber 6 discharges the adsorbed evaporated fuel from the purge port 22.

The third adsorption chamber 6 is defined by a first filter 6A and a second filter 6B each arranged inside the outer case 2. The first filter 6A separates a space communicating with the charge port 21 and the purge port 22 connected to the third adsorption chamber 6 from the third adsorption chamber 6.

The second filter 6B separates the communicating passage to the first adsorption chamber 4 from the third adsorption chamber 6. The second filter 6B is pressed toward the charge port 21 and the purge port 22 by a spring 6D through a grid 6C having a grid shape. The grid 6C may have a slit shape, a porous shape, or the like.

The filters 6A, 6B defining the third adsorption chamber 6 has functions similar to those of the filters 4A, 4B of the first adsorption chamber 4.

The evaporated fuel taken in from the charge port 21 is adsorbed into the third adsorbent 9 in the third adsorption chamber 6. The evaporated fuel that was not adsorbed in the third adsorption chamber 6 moves to the first adsorption chamber 4 in the inner case 3, and then adsorbed into the first adsorbent 7 in the first adsorption chamber 4.

Thereafter, the evaporated fuel that was not adsorbed in the first adsorption chamber 4 moves to the second adsorption chamber 5 in the inner case 3, and then adsorbed into the second adsorbent 8 in the second adsorption chamber 5. The gas from which the evaporated fuel was adsorbed is released from the atmosphere port 23.

By taking in air from the atmosphere port 23, the evaporated fuel adsorbed into the adsorbent in each of the first adsorption chamber 4, the second adsorption chamber 5, and the third adsorption chamber 6 is discharged from the purge port 22 to the engine. As a result, the air containing the evaporated fuel is supplied to the engine.

Adsorbent

Each of the first adsorbent 7, the second adsorbent 8, and the third adsorbent 9 adsorbs the evaporated fuel and butane supplied with the air and the like to the canister 1. These adsorbents desorb the evaporated fuel and the butane by the introduced external air. The desorbed evaporated fuel is supplied to the engine.

Examples of the material of the first adsorbent 7, the second adsorbent 8, and the third adsorbent 9 may include activated carbon and zeolite. Examples of the activated carbon may include an aggregate of granular adsorbent, a honeycomb-shaped molded activated carbon, and fibrous activated carbon molded into a sheet shape, a rectangular parallelepiped shape, a circular columnar shape, and a rectangular columnar shape. The first adsorbent 7, the second adsorbent 8, and the third adsorbent 9 may be the same type of adsorbent, or different types of adsorbent.

Modified Example of First Embodiment

Figure 4A:
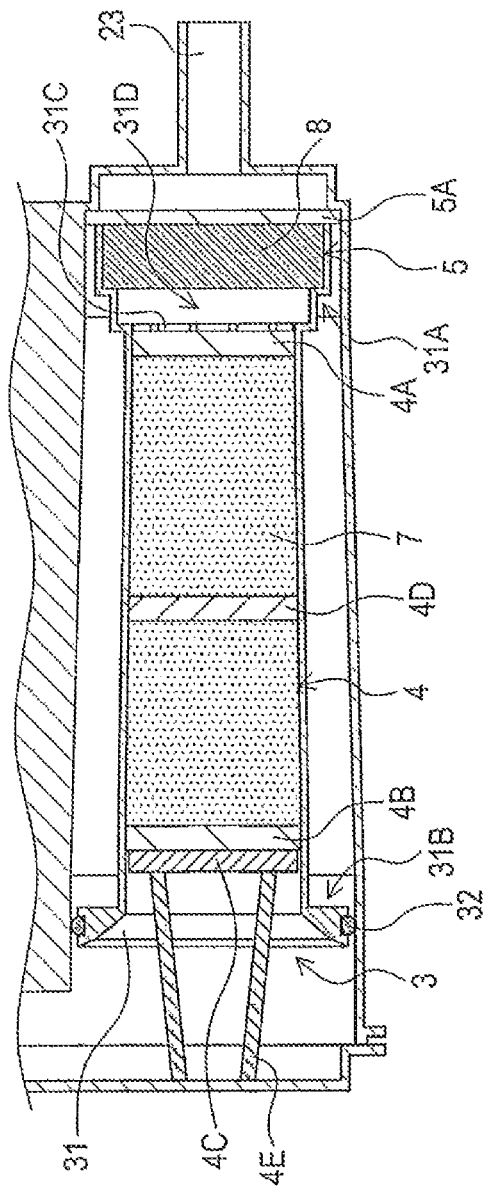
FIG. 4A and FIG. 4B are modified examples of a first adsorption chamber in the canister of FIG. 1.

As shown in FIG. 4A, the first adsorption chamber 4 may be divided into two or more chambers by a partition filter 4D along the flow path of the evaporated fuel. That is, the canister 1 may include two or more first adsorption chambers 4. Adsorbents arranged in the two or more first adsorption chambers 4 may be the same type, or different types.

Figure 4B:
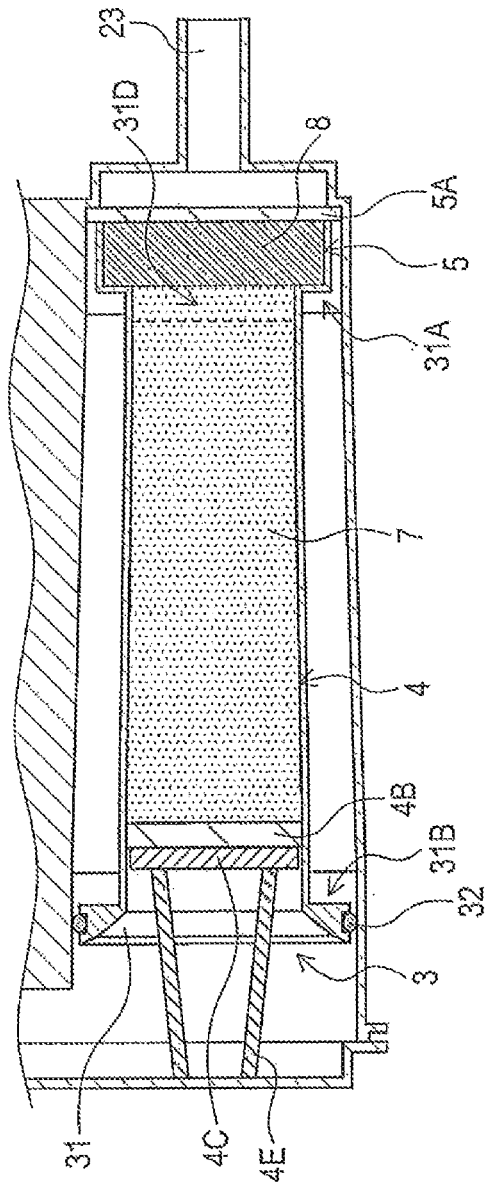

As shown in FIG. 4B, the first adsorption chamber 4 may be extended to the first enlarged diameter portion 31D. In this case, the first filter 4A of FIG. 1 is not provided, and a boundary between the first adsorbent 7 and the second adsorbent 8 directly serves as a boundary between the first adsorption chamber 4 and the second adsorption chamber 5.

1-2. Effects

In the embodiments detailed above, following effects can be obtained.

(1a) By inserting the inner case 3 into the outer case 2, the canister 1 including the first adsorption chamber 4 and the second adsorption chamber 5 having different cross-sectional areas can be obtained. This reduces the welding portions of the case in the canister 1. As a result, production costs of the canister 1 can be reduced.

(1b) The third adsorption chamber 6 is arranged outside the inner case 3, which allows to relatively easily ensure a capacity of the third adsorption chamber 6 provided as a main chamber.

(1c) The cross-sectional area perpendicular to the gas flow direction in the second adsorption chamber 5 is larger than the cross-sectional area perpendicular to the gas flow direction in the first adsorption chamber 4, which reduces the ventilation resistance of the canister 1 while reducing the production costs of the canister 1.

(1d) The gas flow direction in the second adsorption chamber 5 is parallel to the gas flow direction in the first adsorption chamber 4, which simplifies the structure of the inner case 3. As a result, the effect of reducing the production costs of the canister 1 is promoted.

2-2. Second Embodiment

2-1. Configuration

Figure 5:
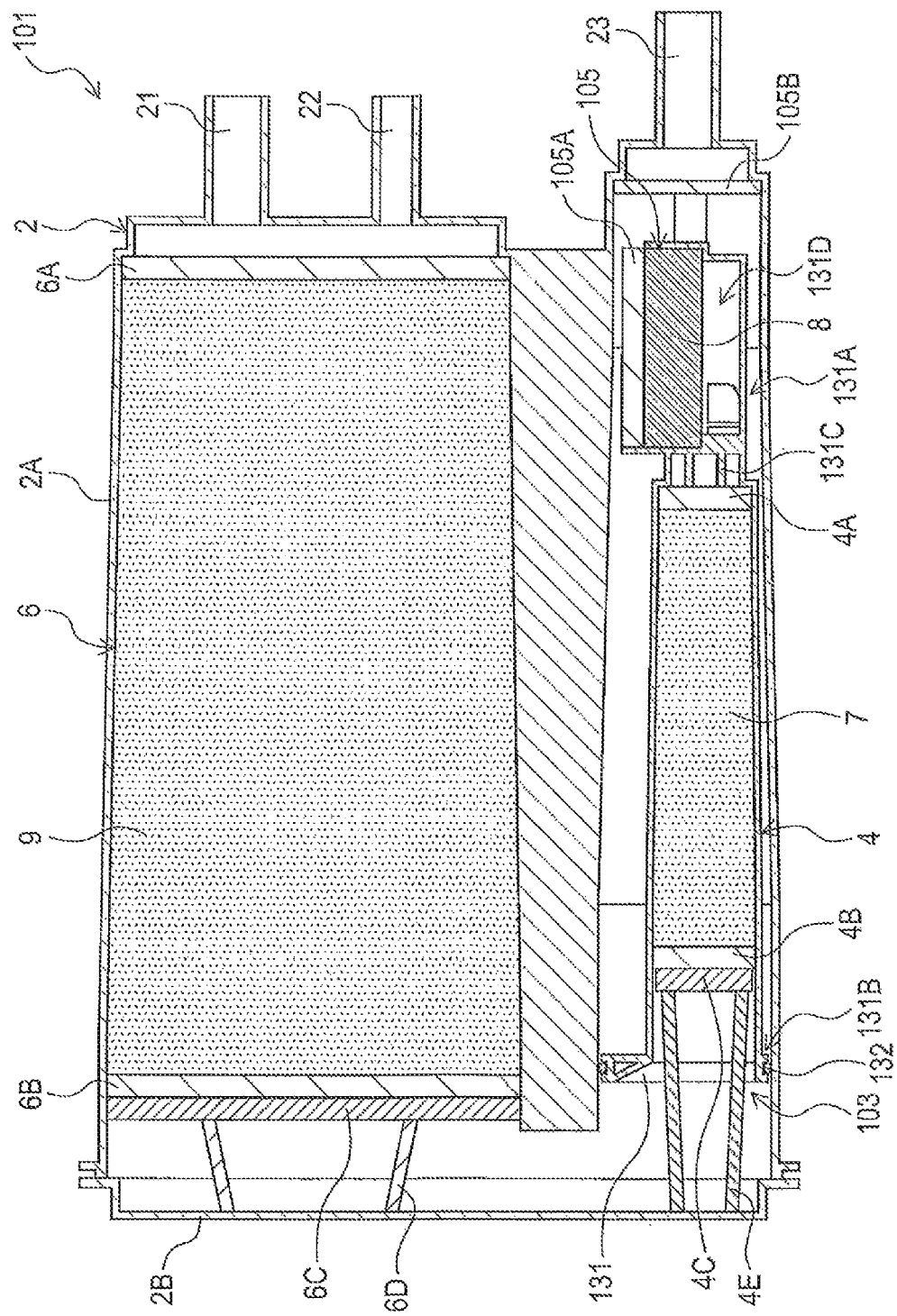
FIG. 5 is a schematic sectional view of a canister in another embodiment different from FIG. 1.

A canister 101 shown in FIG. 5 adsorbs and desorbs the evaporated fuel occurred in the fuel tank of the vehicle. The canister 101 includes an outer case 2, an inner case 103, a first adsorption chamber 4, a second adsorption chamber 105, a third adsorption chamber 6, a first adsorbent 7, a second adsorbent 8, and a third adsorbent 9.

The outer case 2, first adsorption chamber 4, third adsorption chamber 6 and adsorbents 7, 8, 9 of the canister 101 are the same as those of the canister 1 of FIG. 1. Therefore, the same reference numerals are given to these components and the description thereof is omitted. In this embodiment, an outer shape of the outer case 2 is different from that of FIG. 1; however, the inner structure thereof is the same.

Inner Case

The inner case 103 is arranged inside the outer case 2, and has an inner space connected through to the atmosphere port 23. The inner case 103 is obtained, for example, by molding a resin using a metallic mold.

Figure 6A:
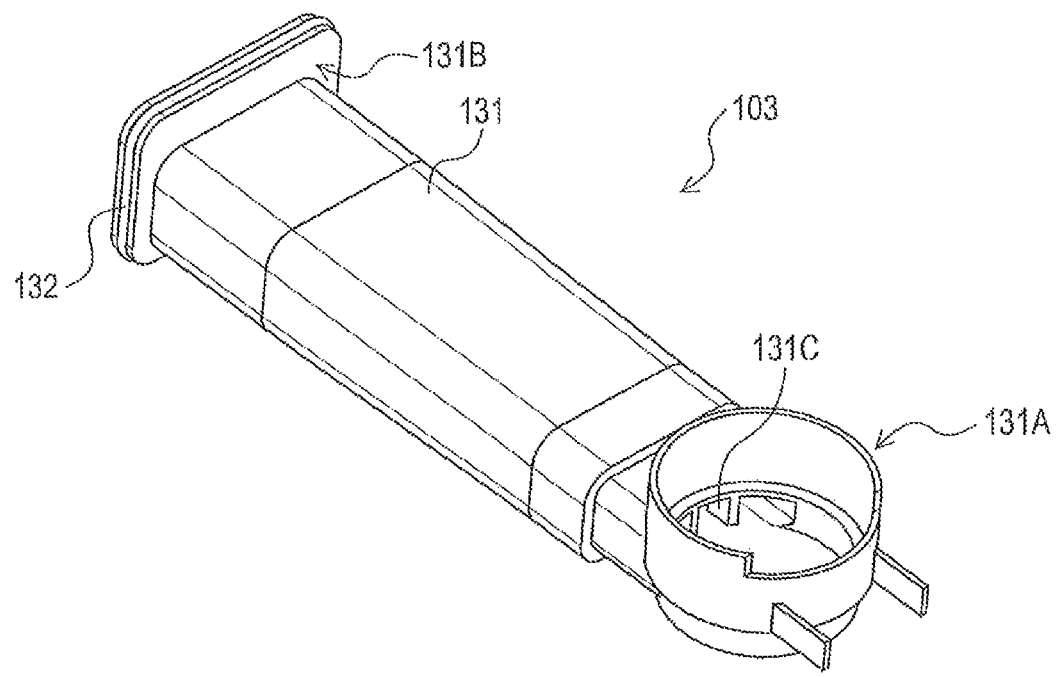
FIG. 6A is a schematic perspective view of an inner case in the canister of FIG. 5.
Figure 6B:
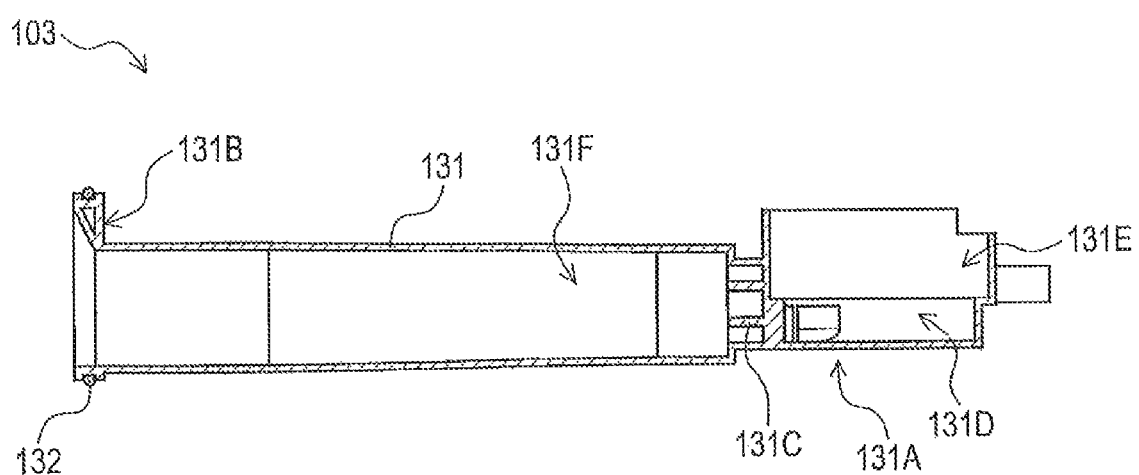
FIG. 6B is a schematic sectional view of the inner case of FIG. 6A.

As shown in FIG. 6A and FIG. 6B, the inner case 103 has a cylindrical body 131 having a cylindrical shape and a sealing member 132. The cylindrical body 131 has a first end 131A to change the gas flow direction and a flange-shaped second end 131B.

The first end 131A is an end to be connected to the atmosphere port 23 (see FIG. 5). The first end 131A has a turning part 131D to turn a flow direction of gas from a central space 131F by approximately 90 degrees, and an enlarged diameter portion 131E having an inner diameter larger than that of the turning part 131D. In the central space 131F, the first adsorption chamber 4 is formed by placing the first adsorbent 7.

The turning part 131D is provided adjacent to the central space 131F, and is separated from the central space 131F by an axially extending partition member 131C. The turning part 131D constitutes a space to connect the first adsorption chamber 4 and the second adsorption chamber 105 to communicate with each other. The central axis of the cylindrical body 131 is bent in the turning part 131D.

The enlarged diameter portion 131E is provided outside the turning part 131D in the axial direction so as to be continuous to the turning part 131D. In the enlarged diameter portion 131E, the second adsorption chamber 105 is formed by placing the second adsorbent 8.

The second end 131B is an end opposite the first end 131A. That is, the second end 131B is an end communicating with the third adsorption chamber 6. The second end 131B has an outer diameter larger than diameters of any parts of the cylindrical body 131 other than the second end 131B. However, the outer diameter of the second end 131B may be equal to or less than the outer diameter of the first end 131A.

The second end 131B has the sealing member 132 arranged in an outer peripheral surface thereof. The sealing member 132 is an elastic ring-shaped member. Functions of the sealing member 132 are the same as those of the sealing member 32 of the first embodiment.

Second Adsorption Chamber

As shown in FIG. 5, the second adsorption chamber 105 is arranged in an inner space of the inner case 103 (specifically, inside the first end 131A).

The second adsorption chamber 105 stores the second adsorbent 8, and arranged between the first adsorption chamber 4 and the atmosphere port 23 in the flow path of the evaporated fuel. The second adsorption chamber 105 communicates with both of the first adsorption chamber 4 and the atmosphere port 23. The gas flow direction in the second adsorption chamber 105 intersects with (specifically, is substantially perpendicular to) the gas flow direction in the first adsorption chamber 4.

A cross-sectional area perpendicular to the gas flow direction in the second adsorption chamber 105A is larger than a cross-sectional area perpendicular to the gas flow direction in the first adsorption chamber 4. A length of the second adsorption chamber 105 in the gas flow direction is smaller than a length of the first adsorption chamber 4 in the gas flow direction. However, the length of the second adsorption chamber 105 in the gas flow direction may be larger than the length of the first adsorption chamber 4 in the gas flow direction.

The second adsorption chamber 105 is defined by a first filter 105A arranged to cover the first end 131A of the inner case 103 and by a stepped portion in the first end 131A. Between the first filter 105A and the atmosphere port 23, a second filter 105B is arranged.

The first filter 105A separates a space communicating with the atmosphere port 23 from the second adsorption chamber 105. The first filter 105A defining the second adsorption chamber 105 has functions similar to those of the filters 4A, 4B of the first adsorption chamber 4.

In this embodiment, the first filter 105A faces an inner wall of the outer case 2. Thus, the flow direction of the evaporated fuel passed through the second adsorption chamber 105 is changed due to a collision with the inner wall.

The first filter 105A is press-fitted in the first end 131A. The second filter 105B is fixed to the outer case 2 by ultrasonic welding, for example. The inner case 103 is inserted into the outer case 2 so that the first end 131A is pressed to the second filter 105B.

In this embodiment, the second adsorbent 8 is a block-shaped agglomeration of a hardened granular adsorbent, or an aggregate of fibrous adsorbents. A surface of the second adsorbent 8 opposite the atmosphere port 23 is in contact with the stepped portion of the first end 131A. Thus, between the second adsorbent 8 and the partition member 131C, a buffer space configured of the turning part 131D is provided. This buffer space does not contain an adsorbent. When the second adsorbent 8 in the form of agglomeration or aggregate is used in this way, the first filter 105A is not necessarily provided to hold the adsorbent.

The flow direction of the gas passed through the first adsorption chamber 4 is changed in the turning part 131D, and the gas enters the second adsorption chamber 105. Then, the flow direction of the gas passed through the second adsorption chamber 105 is changed again by the inner wall of the outer case 2 facing the first filter 105A. Thereafter, the gas is discharged from the atmosphere port 23.

Modified Example of Second Embodiment

As shown in FIG. 7A, the first adsorption chamber 4 may be divided into two or more chambers by a partition filter 4D along the flow path of the evaporated fuel. That is, the canister 101 may include two or more first adsorption chambers 4. Adsorbents arranged in the two or more first adsorption chambers 4 may be the same type, or different types.

As shown in FIG. 7B, the canister 101 does not necessarily include the second filter 105B arranged between the atmosphere port 23 and the first filter 105A (see FIG. 5). In this embodiment, the first filter 105A is fixed to the inner case 103 by ultrasonic-welding, for example, and serves as the second filter 105B of FIG. 5.

Figure 8:
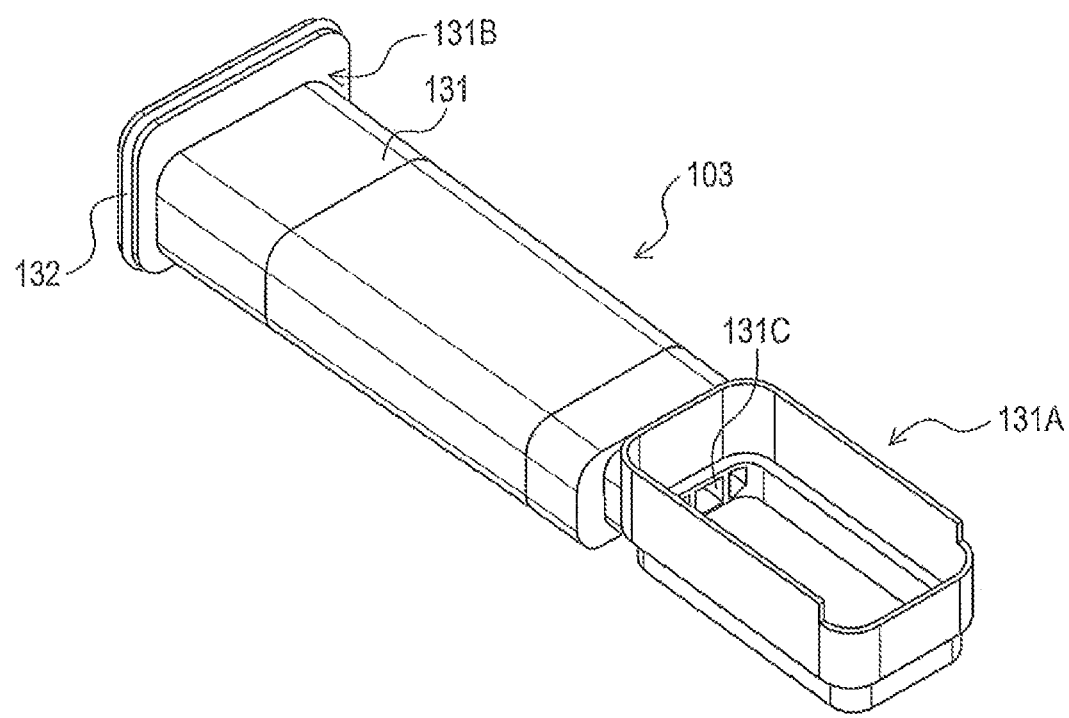
FIG. 8 is a modified example of the inner case in the canister of FIG. 5.

Furthermore, as shown in FIG. 8, an opening of the first end 131A of the inner case 103 may have a quadrangle shape.

2-2. Effects

In the embodiments detailed above, following effects can be obtained.

(2a) The gas flow direction in the second adsorption chamber 105 intersects with the gas flow direction in the first adsorption chamber 4, which enhances the degree of freedom in an external size of the canister 101. As a result, the canister 101 can be made compact.

3. Other Embodiments

Although the embodiments of the present disclosure have been described above, it should be appreciated that the present disclosure is not limited to the above embodiments and can take various forms.

(3a) The canister of any one of the above described embodiments may additionally include an auxiliary chamber storing an adsorbent between the inner case and the atmosphere port. That is, the atmosphere port may be connected to the inner case through another chamber (i.e. auxiliary chamber).

(3b) A function served by a single element in any of the above-described embodiments may be achieved by a plurality of elements, or a function served by a plurality of elements may be achieved by a single element. A part of the configurations of the aforementioned embodiments may be omitted. At least part of the configurations of the aforementioned embodiments may be added to or replaced with the configurations of the other above-described embodiments. It should be noted that all modes included in the technical idea specified from the wording described in the claims are embodiments of the present disclosure.

What is claimed is:

1. A canister for adsorbing and desorbing evaporated fuel occurred in a fuel tank of a vehicle, the canister comprising:
   an outer case including
      a charge port that takes in the evaporated fuel,
      a purge port that discharges the evaporated fuel, and
      an atmosphere port open to the atmosphere;
   an inner case arranged inside the outer case, the inner case having an inner space to which the atmosphere port is connected directly or through another chamber;
   a first adsorption chamber arranged in the inner space of the inner case;
   a second adsorption chamber arranged between the first adsorption chamber and the atmosphere port in a flow path of the evaporated fuel in the inner space of the inner case;
   a first adsorbent stored in the first adsorption chamber; and
   a second adsorbent stored in the second adsorption chamber;
   wherein a cross-sectional area perpendicular to a gas flow direction in the second adsorption chamber and a cross-sectional area perpendicular to a gas flow direction in the first adsorption chamber are different.

2. The canister according to claim 1, further comprising:
   a third adsorption chamber arranged inside the outer case and outside the inner case, the third adsorption chamber having the charge port and the purge port connected thereto; and
   a third adsorbent stored in the third adsorption chamber.

3. The canister according to claim 1,
   wherein the cross-sectional area perpendicular to the gas flow direction in the second adsorption chamber is larger than the cross-sectional area perpendicular to the gas flow direction in the first adsorption chamber.

4. The canister according to claim 1,
   wherein the gas flow direction in the second adsorption chamber is parallel to the gas flow direction in the first adsorption chamber.

5. The canister according to claim 1,
   wherein the gas flow direction in the second adsorption chamber intersects with the gas flow direction in the first adsorption chamber.

* * * * *